United States Patent
Kolhouse et al.

(10) Patent No.: US 11,724,594 B2
(45) Date of Patent: Aug. 15, 2023

(54) USING SKIP FIRE WITH POWER TAKE-OFF

(71) Applicants: Tula Technology, Inc., San Jose, CA (US); Cummins Inc., Columbus, IN (US)

(72) Inventors: J. Steven Kolhouse, Columbus, IN (US); Lisa A. Orth-Farrell, Columbus, IN (US); Steven E. Carlson, Oakland, CA (US); Aaron W. Beinborn, Columbus, IN (US)

(73) Assignees: Tula Technology, Inc., San Jose, CA (US); Cummins Inc., Columbus, IN (US)

( * ) Notice: Subject to any disclaimer, the term of this patent is extended or adjusted under 35 U.S.C. 154(b) by 59 days.

(21) Appl. No.: 16/926,174

(22) Filed: Jul. 10, 2020

(65) Prior Publication Data

US 2022/0009348 A1    Jan. 13, 2022

(51) Int. Cl.
*F02D 41/02*    (2006.01)
*B60K 17/28*    (2006.01)
(Continued)

(52) U.S. Cl.
CPC .............. *B60K 17/28* (2013.01); *B60K 17/02* (2013.01); *B60N 2/002* (2013.01); *F01N 11/002* (2013.01);
(Continued)

(58) Field of Classification Search
CPC ...... F02D 17/02; F02D 41/02; F02D 41/0215; F02D 41/0235; F02D 2200/0802;
(Continued)

(56) References Cited

U.S. PATENT DOCUMENTS 4,434,767 A    3/1984    Kohama et al.
4,489,695 A    12/1984   Kohama et al.
(Continued)

FOREIGN PATENT DOCUMENTS

JP    2684908        12/1997
JP    2019508310      3/2019
(Continued)

OTHER PUBLICATIONS

JP 2019 558949 English Translation Version (Year: 2019).*
(Continued)

*Primary Examiner* — Hai H Huynh
*Assistant Examiner* — Johnny H Hoang
(74) *Attorney, Agent, or Firm* — Foley & Lardner LLP

(57) ABSTRACT

Engine controllers and control schemes that facilitate skip fire engine operation in conjunction with use power take-off devices are described. In one aspect, a skip fire mode is exited when the power take-off unit is engaged and the current torque request exceeds a torque threshold. In some embodiments, the exit is delayed when the temperature of an after treatment system is below a designated temperature threshold. In another aspect, the engine transitions to the skip fire mode when the power take-off unit disengages. In some embodiments, exiting is conditioned on the current torque request being less than a torque threshold. In some embodiments, the transition is made immediately, whereas in others the transition only occurs when the power take-off unit is not reengaged for a period of time or is further conditioned on determining that the power take-off unit is likely to remain disengaged for the period of time.

20 Claims, 4 Drawing Sheets

(51) Int. Cl.
    *F02D 17/02*         (2006.01)
    *B60K 17/02*         (2006.01)
    *F01N 11/00*         (2006.01)
    *B60N 2/00*          (2006.01)

(52) U.S. Cl.
    CPC .......... *F02D 17/02* (2013.01); *F02D 41/0215* (2013.01); *F02D 41/0235* (2013.01); *F02D 2200/0802* (2013.01); *F02D 2200/60* (2013.01)

(58) Field of Classification Search
    CPC ..... F02D 2200/60; B60N 2/002; B60K 17/02; B60K 17/28; F01N 11/002
    See application file for complete search history.

(56) References Cited

U.S. PATENT DOCUMENTS

| | | | |
|---|---|---|---|
| 4,509,488 A | 4/1985 | Forster et al. | |
| 5,377,631 A | 1/1995 | Schechter et al. | |
| 6,158,411 A | 12/2000 | Morikawa | |
| 6,267,189 B1 * | 7/2001 | Nielsen | B60W 30/1846 180/53.1 |
| 6,405,705 B1 | 6/2002 | Dunsworth et al. | |
| 6,619,258 B2 | 9/2003 | McKay et al. | |
| 7,063,062 B2 | 6/2006 | Lewis et al. | |
| 7,066,136 B2 | 6/2006 | Ogiso | |
| 7,086,386 B2 | 8/2006 | Doering | |
| 7,377,103 B2 | 5/2008 | Yu et al. | |
| 7,503,312 B2 | 3/2009 | Surnilla et al. | |
| 7,577,511 B1 | 8/2009 | Tripathi et al. | |
| 7,849,835 B2 | 12/2010 | Tripathi et al. | |
| 7,886,715 B2 | 2/2011 | Tripathi et al. | |
| 7,930,087 B2 | 4/2011 | Gibson et al. | |
| 7,954,474 B2 | 6/2011 | Tripathi et al. | |
| 8,012,062 B2 | 9/2011 | Wegeng et al. | |
| 8,099,224 B2 | 1/2012 | Tripathi et al. | |
| 8,131,445 B2 | 3/2012 | Tripathi et al. | |
| 8,131,447 B2 | 3/2012 | Tripathi et al. | |
| 8,616,181 B2 | 12/2013 | Sahandiesfanjani et al. | |
| 8,701,628 B2 | 4/2014 | Tripathi et al. | |
| 9,086,020 B2 | 7/2015 | Tripathi et al. | |
| 9,328,672 B2 | 5/2016 | Serrano et al. | |
| 9,387,849 B2 | 7/2016 | Soliman et al. | |
| 9,399,964 B2 | 7/2016 | Younkins et al. | |
| 9,512,794 B2 | 12/2016 | Serrano et al. | |
| 9,745,905 B2 | 8/2017 | Pirjaberi et al. | |
| 10,071,720 B2 | 9/2018 | Foster et al. | |
| 10,247,072 B2 | 4/2019 | Younkins et al. | |
| 10,494,971 B2 | 12/2019 | Younkins et al. | |
| 2009/0150038 A1 | 6/2009 | Woods | |
| 2010/0050993 A1 | 3/2010 | Zhao et al. | |
| 2011/0130902 A1 | 6/2011 | Heisel et al. | |
| 2014/0172270 A1 * | 6/2014 | Lee | F02D 41/0087 701/102 |
| 2017/0326964 A1 * | 11/2017 | Lahr | B60K 23/0808 |
| 2018/0347432 A1 | 12/2018 | Dutto et al. | |
| 2019/0003442 A1 | 1/2019 | Ortiz-Soto et al. | |
| 2019/0234323 A1 * | 8/2019 | Weber | F01L 13/0036 |
| 2020/0025050 A1 | 1/2020 | Chen et al. | |
| 2020/0088151 A1 | 3/2020 | Ortiz-Soto et al. | |
| 2020/0218258 A1 | 7/2020 | Subramanian et al. | |

FOREIGN PATENT DOCUMENTS

| | | |
|---|---|---|
| WO | WO 2010/006311 | 1/2010 |
| WO | WO 2011/085383 | 7/2011 |
| WO | WO2019/116738 | 6/2019 |

OTHER PUBLICATIONS

International Search Report and Written Opinion dated Jul. 26, 2021 from International Application No. PCT/US2021/026693.
Fleet Owner, "Ram Truck: Chassis Cab Trucks Offer Most PTO Options", https://www.fleetowner.com/equipment/article/21693054/ram-truck-chassis-cab-trucks-offer-most-pto-options, Mar. 8, 2016.
Wikipedia, "Power Take-Off", https://en.wikipedia.org/wiki/Power_take-off, May 21, 2020.

* cited by examiner

USING SKIP FIRE WITH POWER TAKE-OFF

FIELD

The present disclosure relates generally to the control of engines used to drive power take-off units. More particularly, methods and engine controllers are described that facilitate implementing skip fire engine control in conjunction with the use of power take-off units.

BACKGROUND

There are a number of utility trucks, tractors and other vehicles that have a working implement that draws power from an internal combustion engine that drives the vehicle through a mechanical connection to the engine. Examples include vehicles having a mechanical service arm (e.g., backhoes, excavators, bucket trucks, etc.); concrete mixers; stump grinders; dump trucks; forklifts; tow trucks; garbage trucks (e.g., a garbage truck compactor); various agriculture equipment used with tractors, and many others. The mechanisms that take power from the engine and transmit such power to the working implement are often referred to as power take-off (PTO) devices. Working implements that receive power from a power take-off device may be referred to as power take-off implements.

Many of the implements that utilize power take-off operate primarily while the host vehicle is stopped or moving slowly such that little or no engine power is required by the vehicle's traction wheels. In such situations the engine may run at idle for extended periods while the implement is not in active use. The fuel economy and/or pollutant emissions characteristics of many engines is quite poor when running at idle and other low load operations. As such, there are continuing efforts to improve the fuel economy and/or emissions characteristics of engines used to drive power take-off implements.

SUMMARY

A variety of engine controllers and engine control schemes are described that facilitate skip fire operation of engines having a power take-off unit operatively connected thereto. In one aspect, methods and controllers are described that control exiting a skip fire with cylinder deactivation operational mode. In some embodiments, an action indicative of an engagement or a likely engagement of the power take-off unit is detected while the engine idling or delivering a torque less than a designated threshold torque with the power take-off unit disengaged from the engine. A determination is also made as to whether a current torque request exceeds a PTO skip fire torque threshold. The engine exits the skip fire operational mode when the power take-off unit is engaged and the current torque request exceeds the PTO skip fire threshold. When the current torque request does not exceed the PTO skip fire torque threshold, continued skip fire operation may be continued, although it may be necessary or appropriate to transition to a different operational firing fraction suitable for delivering the requested torque with the PTO unit engaged.

In some embodiments, the engine transitions to an all cylinder firing operational mode from the skip fire operational mode. A variety of trigger actions can be used to indicate the engagement or likely engagement of the power take-off unit. By way of example, suitable triggers may include: engagement of a clutch associated with the power take-off unit; movement of a control stick associated with the power take-off unit; actuation of a throttle or power control actuator associated with the power take-off unit; etc.

In some embodiments, exiting the skip fire operational mode is delayed when the temperature of an exhaust gas after treatment system is below a designated temperature threshold. In some embodiments, when it is determined that an exhaust gases pollutant emissions level is above a designated emissions level, the skip fire operational mode is exited regardless of whether the current torque request exceeds the PTO skip fire torque threshold. In some embodiments, the monitored exhaust gases pollutant is or includes $NO_x$.

In another aspect, an engine operating in an all cylinder operating mode is transitioned to a skip fire with cylinder deactivation operating mode when it is determined that the power take-off unit is no longer engaged with the engine. In some such embodiments, exiting the all cylinder operating mode is conditioned on determinations that both (a) the power take-off unit is no longer engaged with the engine, and (b) a current torque request is less than a PTO skip fire torque threshold. In some embodiments, the transition is made immediately, whereas in others the transition only occurs when the power take-off unit is not reengaged for a designated period of time.

In some embodiments, the transition to the skip fire operational mode is further conditioned on determining that the power take-off unit is likely to remain disengaged for the period of time. A number of event or conditions may be detected to suggest that the power take-off unit is likely to remain disengaged for a period of time. For example, suitable triggers may include: a determination that an operator seat is empty; a determination that a component associated with the power take-off unit has not moved for a period of time; a determination that the power take-off unit is in a home position; etc.

In some embodiments an exhaust gases pollutant emissions level must be below a designated emissions level to enter the skip fire operational mode. In some embodiments the engine transitions to the skip fire operational mode when the temperature of an exhaust gas after treatment system is below a designated temperature threshold.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
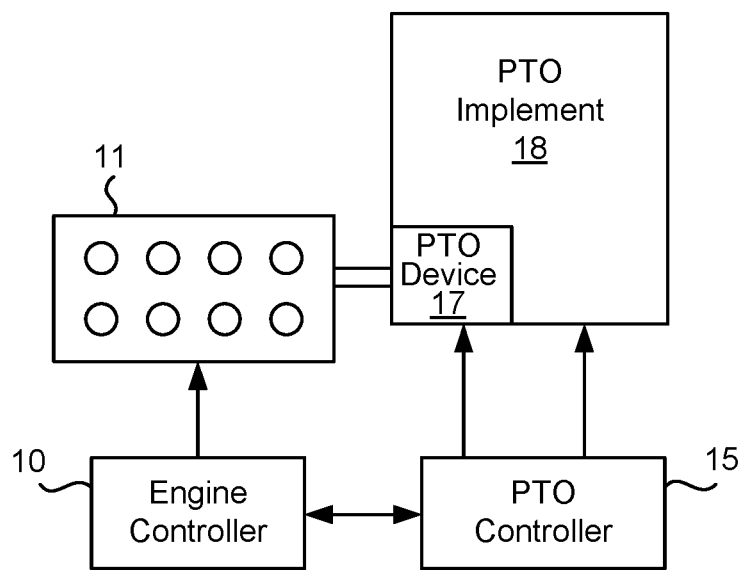
FIG. 1 is a diagrammatic illustration of a vehicle having a power take-off implement.

The fuel efficiency of many types of internal combustion engines can be improved by varying the displacement of the engine. This allows for the full torque to be available when required, yet can significantly reduce pumping losses and improve thermodynamic efficiency through the use of a smaller displacement when full torque is not required. The most common method of varying the displacement of an engine involves deactivating a group of cylinders substantially simultaneously. In this approach, no fuel is delivered to the deactivated cylinders and their associated intake and exhaust valves are kept closed (and the cylinders remain deactive) as long as the engine remains in the same variable displacement state.

Another engine control approach that varies the effective displacement of an engine is referred to as "skip fire" engine control. In general, skip fire engine control contemplates selectively skipping the firing of certain cylinders during selected firing opportunities. Skip fire engine operation is distinguished from conventional variable displacement engine control in which a designated set of cylinders are deactivated substantially simultaneously and remain deactivated as long as the engine remains in the same variable displacement mode. Thus, the sequence of specific cylinders firings will always be exactly the same for each engine cycle during operation in a variable displacement mode (so long as the engine remains in the same displacement mode), whereas that is often not the case during skip fire operation.

In general, skip fire engine operation facilitates finer control of the effective engine displacement than is possible using a conventional variable displacement approach. For example, firing every third cylinder in an 8 cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences or patterns.

Applicant Tula Technology, has developed a technology referred to as dynamic skip fire in which firing decisions are made on a cylinder firing opportunity by cylinder firing opportunity basis. In many applications, a single firing decision is made at a time. In other implementations, firing decisions for small sets of cylinders may be made at the same time (e.g., on an engine cycle by engine cycle basis where the firing decisions for all of the cylinders in a particular engine cycle are made at substantially the same time). Various aspects of dynamic skip fire are described in a number of patents including U.S. Pat. Nos. 7,954,474, 7,886,715, 7,849,835, 7,577,511, 8,099,224, 8,131,445, 8,131,447, 8,616,181, 8,701,628, 9,086,020 9,328,672, 9,387,849, 9,399,964, 9,512,794, 9,745,905, and others, each of which is incorporated herein by reference. The present application describes additional engine control features and enhancements that can further improve engine performance in a variety of applications.

Skip fire engine operation can also be used to help manage vehicle emissions and/or help manage the temperature of exhaust after treatment systems. Both spark ignition and compression ignition engines generally require one or more after treatment elements to limit emission of undesirable pollutants that are combustion byproducts. Catalytic converters and particulate filters are two common after treatment elements. Modern spark ignition engines typically use a three-way catalyst that both oxidizes unburned hydrocarbons and carbon monoxide and reduces nitrous oxides ($NO_x$). Three-way catalysts require that on average, the engine combustions be at or near a stoichiometric air/fuel ratio, so that both oxidation and reduction reactions can occur in the catalytic converter. Since compression ignition engines generally run lean, they cannot rely solely on a conventional 3-way catalyst to meet emissions regulations. Instead they use other types of after treatment devices to reduce noxious emissions. These after treatment devices may use a catalyst such as a Diesel Oxidizing Catalyst (DOC), selective catalyst reduction (SCR), $NO_x$ traps and/or particulate filters to reduce nitrous oxides to molecular nitrogen and capture particulate emissions.

Most current exhaust gas after treatment systems work best when maintained in a designated operating temperature range. The specific operating temperature ranges that are appropriate vary based on the specific after treatment technology used but often tend to be in the temperature range of about 200° C. to 400° C. When an engine is idling or otherwise operating at a low power output, the exhaust gas temperature is typically lower which in turn tends to lower the temperature of the after treatment system. When an engine idles for an extended period, the temperature of the after treatment system can drop below the system's preferred operating temperature range which can lead to the emission of undesirable pollutants. This tends to be a particular problem in diesel and other compression ignition engines where the air charge introduced into the cylinders during each cylinder working cycle remains high regardless of the desired engine output resulting in excess air passing through the engine.

The temperature of the exhaust gases can be increased without sacrificing fuel economy by operating the engine in a skip fire mode at idle and other low torque outputs with the corresponding cylinders being deactivated during skipped working cycles such that air is not pumped through the cylinders during skipped working cycles. One factor influencing the exhaust temperature increase is that the load on each fired cylinder working cycle will typically increase. Increased load means that more fuel is injected per fired working cycle which results in higher operating temperatures within the cylinders and correspondingly higher exhaust gas temperatures. Another factor particularly relevant to diesel and other compression ignition engines is that less air is pumped through the engine which again results in a corresponding increase in exhaust gas temperatures. In general, the hotter exhaust gas temperatures can be used to help maintain the temperature of the after treatment systems in its preferred operating range. Skip fire operation can help warm the after treatment system in a variety of other circumstance as well, including following a cold start and other appropriate circumstances. Various skip fire engine controllers and skip fire control schemes suitable for maintaining or quickly attaining a desired exhaust gas after treatment system operating temperature are described in U.S. Pat. Nos. 10,247,072; 10,494,971, and pending U.S. patent application Ser. No. 16/576,972 and 63/029,042, each of which is incorporated herein by reference. Other techniques for managing emission during skip fire operation of an engine are described in U.S. Patent App Nos. 63/020,766 and Ser. No. 16/021,532, both of which are also incorporated herein by reference. Skip fire operation can also be useful in increasing exhaust gas temperatures to the higher temperatures needed for regeneration of particle filters. Some such approaches are also described in the incorporated U.S. Pat. No. 10,494,971.

As pointed out in the background, many utility vehicles that incorporate power take-off implements are often operated for extended periods at idle or other low torque output levels in association with the use of the power take-off implements. Such operation tends to have poor fuel efficiency and emission characteristics and therefore can potentially benefit from skip fire engine operation. However, power take-off devices, and particularly high load power take-off devices, present unique challenges to the implementation of skip fire control. The present disclosure addresses a number of those challenges.

Some of the challenges associated with power take-off units revolve around determining when and when not to utilize skip fire engine operation in conjunction with the use of power take-off implements.

The control systems associated with power take-off devices vary widely. One suitable architecture is illustrated in FIG. 1. In the illustrated embodiment, an engine controller 10 controls engine 11, while a power PTO controller 15 controls power take-off device 17 and power take-off implement 18. In many implementations the power take-off device 17 is part of the power take-off implement 18 (collectively referred to as a power take-off unit) but they are labeled separately here to emphasize the different functionalities.

Figure 2A:
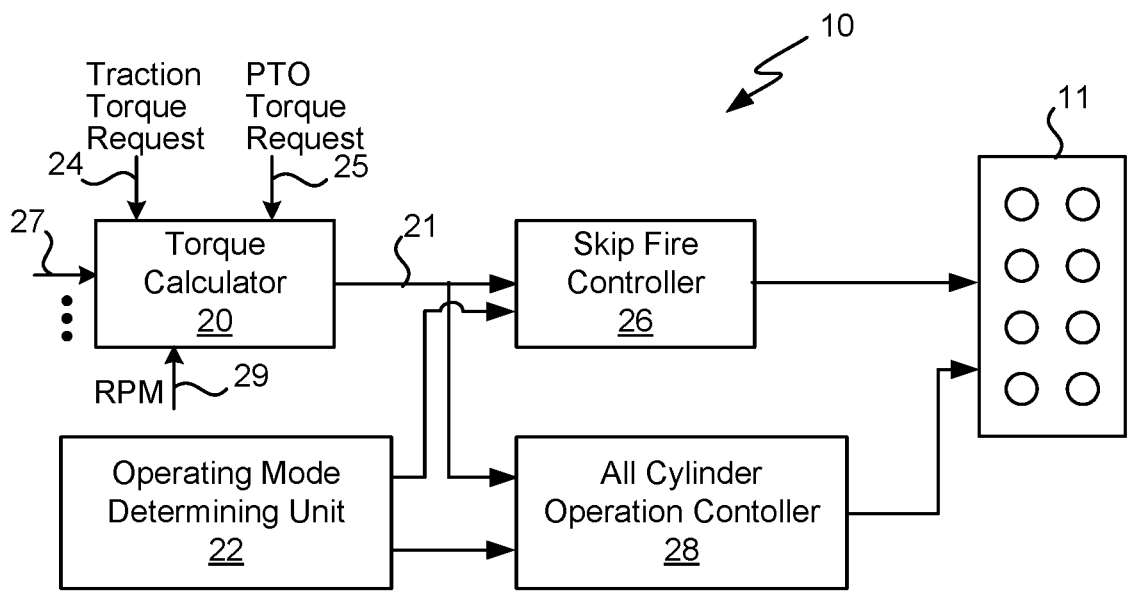
FIG. 2A is a diagrammatic block diagram of an engine controller suitable for directing skip fire engine operation in conjunction with a power take-off operations.

A suitable engine controller design is illustrated in FIG. 2A. The engine controller 10 includes a torque calculator 20, an operating mode determining unit 22, a skip fire controller 26 and an all cylinder operation controller 28. In some implementations, the skip fire controller 26 and all cylinder operation controller 28 are integrated, but they are shown separately in the drawing to emphasize the different operating modes. The skip fire controller 26 may take a variety of different forms and several suitable skip fire controllers are described in some of the incorporated patents and patent applications. More details of one suitable skip fire engine controller are shown in FIG. 2B.

Figure 2B:
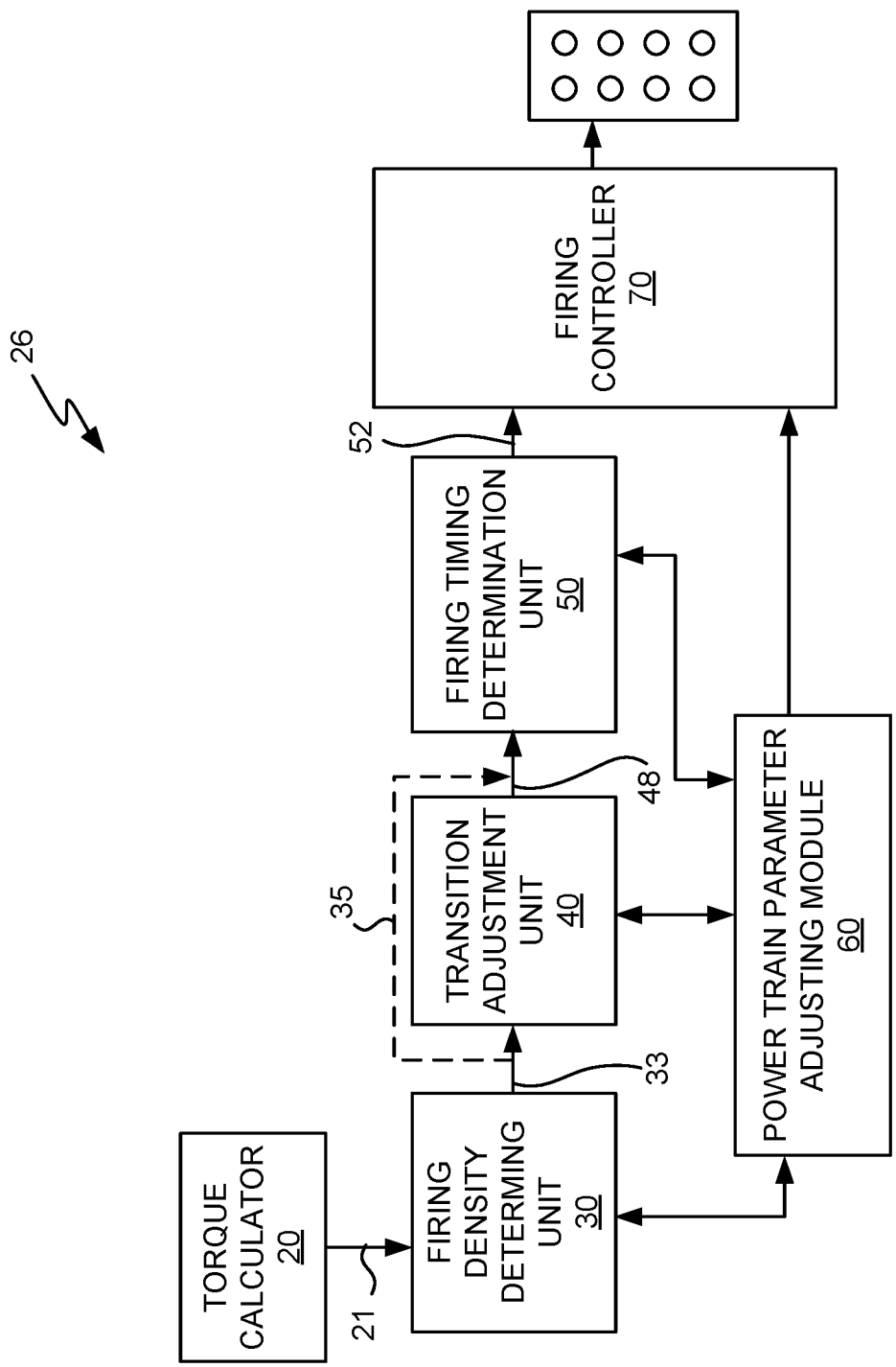
FIG. 2B is a diagrammatic block diagram of skip fire controller suitable for use in the embodiment shown in FIG. 2A.

The skip fire controller 26 illustrated in FIG. 2B includes a firing density determining unit 30, a transition adjustment unit 40, a firing timing determination unit 50, a power train parameter adjusting module 60 and a firing controller 70. For the purposes of illustration, the described components are all shown as integral components of an engine control unit (ECU) 10 that is also capable of directing engine operation in a conventional, all cylinder operation manner. However, it should be appreciated that in other embodiments the functionalities of some or all of the identified components may be separated into separate controllers.

The torque calculator 20 is arranged to determine the desired engine torque at any given time based on a number of inputs. The torque calculator outputs a requested torque 21 to the firing density determining unit 30. The firing density determining unit 30 is arranged to determine a firing density that is suitable for delivering the desired torque based on the current operating conditions and outputs an indication of a firing density that is appropriate for delivering the desired torque. The firing timing determining unit 50 is responsible for determining making actual cylinder firing decisions. That is, it determines whether specific cylinder working cycles will be skipped or fired, and when fired, at what level the firing should be at when multi-level firings are supported (e.g., high/low; high/medium/low, etc.). As such, the firing timing determining unit 50 outputs a series of firing decisions 52 that define a firing sequence that delivers the desired firing density. The firing decisions 52 are passed to firing controller 70 which implements the firing commands.

The torque calculator 20 receives a number of inputs that may influence or dictate the desired engine torque at any time. In power takeoff (PTO) applications, one of the primary inputs to the torque calculator is the torque demand for the traction wheels and a second one of the primary inputs is the torque demand for the PTO implement 18 (FIG. 1). For vehicles that utilized an accelerator pedal to provide the torque request for the traction wheel torque request, an accelerator pedal position (APP) signal 24 (FIG. 2A) may be supplied to the torque calculator. The PTO torque request 25 may come from the PTO controller 15, from a user input device that controls the torque request, or from any other suitable source. If the engine drives other devices, appropriate requests may come from such devices as well. In some embodiments, other controllers that may need to influence the engine's output such as a transmission controller may provide appropriate inputs as well (e.g., AT command 27). There are also a number of factors such as engine speed that may influence the torque calculation. When such factors are utilized in the torque calculations, the appropriate inputs, such as engine speed (RPM signal 29) are also provided or are obtainable by the torque calculator as necessary.

Further, in some embodiments, it may be desirable to account for energy/torque losses in the drive train and/or the energy/torque required to drive engine accessories, such as the air conditioner, alternators/generator, power steering pump, water pumps, vacuum pumps and/or any combination of these and other components. In such embodiments, the torque calculator may be arranged to either calculate such values or to receive an indication of the associated losses so that they can be appropriately considered during the desired torque calculation.

The firing density determining unit 30 in FIG. 2B receives requested torque signal 21 from the torque calculator 20 and other inputs such as engine speed and various power train operating parameters and/or environmental conditions. The firing density determining unit 30 is arranged to select the desired operational firing density to deliver the requested torque based on current condition and various factors that the controller designer considers important. Often these selections are based heavily on factors such as fuel economy, emissions control and NVH considerations.

In some implementations, it is desirable to constrain the engine to operate at one of a fixed set of firing fractions. For example, a skip fire engine controller that permits the use of any firing fraction between zero (0) and one (1) having an integer denominator of five (5) or less would have a total of 11 possible unique firing fractions. These would include: 0, ⅕, ¼, ⅓, ⅖, ½, ⅗, ⅔, ¾, ⅘ and 1).

Since the available set of firing densities is limited, various power train operating parameters such as fuel charge will typically need to be varied to ensure that the actual engine output matches the desired output. In spark ignition engines, mass air charge (MAC) and/or spark timing are other variables that may be controlled.

In the illustrated embodiment, a power train parameter adjusting module 60 is provided that cooperates with the firing density determining unit 30. The power train parameter adjusting module 60 directs the firing controller 70 to set selected power train parameters appropriately to ensure that the actual engine output substantially equals the requested engine output at the commanded effective firing density. By way of example, the power train parameter adjusting module 60 may be responsible for determining the desired fuel charge, MAC, spark timing, cam settings and/or other engine settings that are desirable to help ensure that the actual engine output matches the requested engine output. Although the powertrain parameter adjusting module 60 is illustrated as a separate component, it is often implemented as a part of firing controller 70. Of course, in other embodiments, the power train parameter adjusting module 60 may be arranged to directly control various engine settings. In diesel and other compression engines that don't utilize sparks or vary the cam timing, the functions of the parameter adjusting module 60 may be simplified.

The firing timing determining module 50 is arranged to issue a sequence of firing commands 52 that cause the engine to deliver the percentage of firings dictated by commanded firing fraction 48. The firing sequence can be determined using any suitable approach. In some preferred implementations, the firing decisions are made dynamically on an individual firing opportunity by firing opportunity basis which allows desired changes to be implemented very quickly. Applicant Tula Technology has previously described a variety of skip fire firing timing determining units that are well suited for determining appropriate firing sequence based on potentially time varying requested firing density or engine outputs. Many such firing timing determining units are based on sigma delta conversion which is well suited for making firing decisions on a firing opportunity by firing opportunity basis.

The firing timing determination unit 50 outputs sequence of firing commands 52 that indicate whether specific cylinder working cycles are to be fired or skipped. The firing commands are passed to firing controller 70 or another module such as a combustion controller (not shown in FIG. 2B) which orchestrates the actual firings. A significant advantage of using a sigma delta converter or an analogous structure is that it inherently includes an accumulator function that tracks the portion of firing that have been requested but not yet delivered. Such an arrangement helps smooth transitions by accounting for the effects of previous fire/no fire decisions.

Abrupt transitions between firing densities can lead to undesirable torque surges or dips, i.e. undesirable NVH. Therefore, in the embodiment illustrated in FIG. 2B, transition adjustment unit 40 is arranged to help mitigate vibrations and torque surges/dips associated with step changes in the requested firing density. When a step change in requested firing fraction occurs, the transition adjustment unit 40 has the effect of spreading the change in firing density over a short period. This "spreading" can help smooth transitions between different commanded firing densities and can help compensate for various delays associated with manifold filling. These may include mechanical delays in the changing of the engine parameters and/or inertial type manifold filling/emptying delays. In general, the transition adjustment unit receives requested firing fraction 33 and outputs commanded firing fraction 48. When the requested firing fraction is at steady state, the commanded firing fraction 48 is the same as the requested firing fraction 33. However, when a transition occurs, the effective firing density may be ramped from the previous requested firing density to the target firing density.

If the nature of the transition is such that the transition adjustment unit imposed delays are acceptable, smoother operation can be obtained by using such an arrangement. However, if the nature of the transition is such that a quicker response is desired (as for example, when the driver stomps on the accelerator pedal or during transmission shifts), it may be desirable to bypass or modify the settings of the transition adjustment unit 40 to provide a quicker response. Therefore, some implementations incorporate separate "fast path" 35 and "slow path" approaches for managing firing density change requests. In such applications, the slewing function of the transition adjustment unit 40 can effectively be bypassed for "fast path" responses and used in "slow path" changes. More generally, the transition adjustment unit 40 characteristics may vary depending on inputs governing the desired transition, e.g. the desired firing fraction slew rate may vary with the rate of change and/or magnitude of change of the accelerator pedal position.

In the embodiment illustrated in FIG. 2A, the operating mode determining unit 22 is responsible for determining whether the engine should operate in a skip fire operational mode or an all cylinder operating mode. In some implementations, all cylinder operation can be enforced by instructing the firing fraction determining unit to output a firing fraction of "1"—which corresponds to all cylinder operation.

Figure 3:
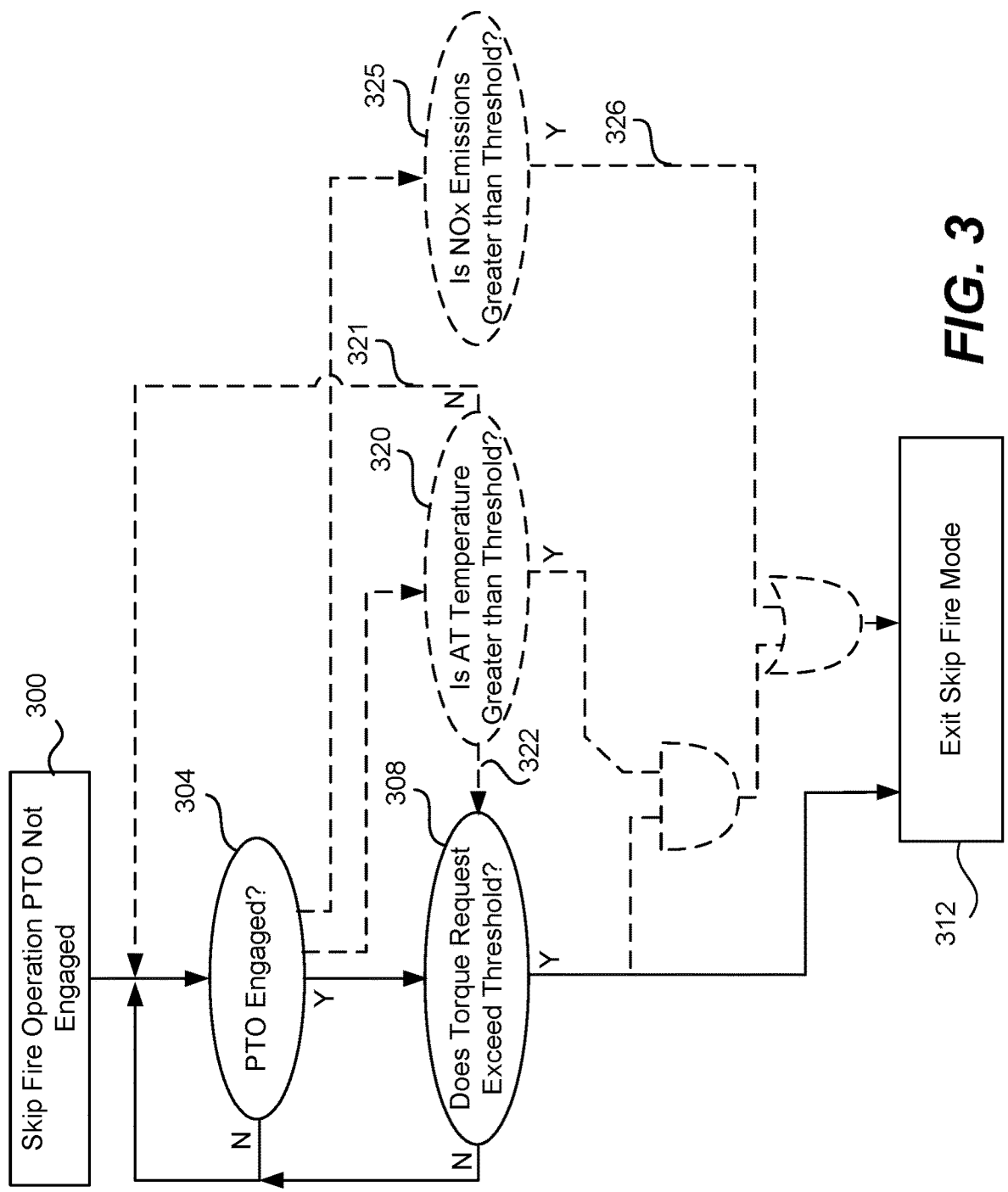
FIG. 3 is a flow chart illustrating a method of exiting skip fire engine operation in conjunction with the use of a power take-off implement.

Referring next to FIG. 3, a method of exiting skip fire engine operation in conjunction with the use of a power take-off unit in conjunction with one embodiment will be described. The method begins with the engine operating in a skip-fire operational mode without the power take-off unit engaged. Block 300. Preferably the cylinders are deactivated during skipped working cycles so that air is not pumped through the corresponding cylinder(s) during the skipped working cycles. The engine controller continually monitors the PTO unit for engagement. Block 304. Engagement of the PTO unit can be directly or indirectly detected in a variety of manners. For example, in some implementations engagement is determined by detecting actuation of a component associated with use of the power take-off implement. One such example is the engagement or actuation of a switch or clutch associated with power take-off. In the case of a clutch, the clutch engagement may be detected by monitoring movement or depression of a clutch pedal, the actuation of a push button used to actuate the clutch, by detecting movement of the clutch itself or in other suitable ways. In other embodiments, engagement of the PTO unit may be detected by detecting movement of a control stick or other control actuator used to control movement of the PTO implement. In still other embodiments, engagement of the PTO unit can be determined based on actuation of a throttle. Of course any other conventional or suitable mechanism can be used to detect activation or engagement of the PTO unit in other embodiments.

When the PTO unit is engaged, the control logic checks whether the engine's torque request exceeds a designated PTO skip fire torque threshold. Block 308. If so, the engine exits the skip fire operational mode as represented by Block 312. Most often, the engine would transition to an all cylinder operating mode. However, in other embodiments, the engine can transition to any other operational mode that is suitable for delivering the requested torque.

In some implementations, the skip fire torque threshold may be a relatively low torque threshold associated with engine idle so that the engine is configured to transition out of a skip fire operational mode to an all cylinder mode any time the engine transitions out of idle. In such engines, the torque request threshold may be replaced with other suitable checks that can be used to identify transitions away for idle. Although exiting skip fire operation when transitioning out of idle is a possibility, it should be appreciated that the engine may be perfectly capable of delivering the torque required by the power take-off device using skip fire operation. Thus, the torque threshold used as a trigger for exiting skip fire operation may be set at any level deemed appropriate for applications involving power take-off by the controller's designers. In many applications, the torque request threshold will be based on the engine's overall torque request which might involve traction torque requests in addition to PTO torque requests. However, in other applications, the torque request threshold used to trigger a skip fire exit may be based on torque requested by the PTO unit(s) alone.

When the torque request engine's torque request is below the skip fire torque threshold with the PTO implement engaged, the firing density determining unit 30 determines that operational firing fraction appropriate for delivering the desired requested torque based on current operating conditions (e.g., engine speed, etc.) as described in several of the incorporated patents. In many circumstances, engagement of the PTO implement will increase the requested torque and it may be necessary or appropriate to transition to a new operational firing fraction suitable for delivering the requested torque. As the load changes during operation of the PTO implement, the firing fraction directed by firing density determining unit (and implemented by the skip fire controller 26) may change as appropriate to deliver the desired operational torque. If/when the requested torque exceeds the skip fire torque threshold (step 308), the engine transitions to the all cylinder operating mode as previously described.

A good example of when continued skip fire operation may be desired is in "light-load" PTO modes of operation. For example, when the PTO shaft is simply driving a hydraulic pump, the increased load may be relatively small and it may be desirable to remain in the skip fire operational mode, although a different firing fraction may be appropriate as a result of the increased engine load.

In some embodiments other factors can optionally be required or otherwise used in conjunction with making a decision whether to exit a skip fire operational mode. Some such decisions may be made based on emissions control considerations. A couple examples of these additional considerations are diagrammatically represented by optional exhaust gas after treatment decision block 320 and $NO_x$ emission decision block 325.

As described above, when the temperature of an exhaust gas after treatment system is low, it can be desirable to operate the engine in a skip fire operational mode to help warm the after treatment system and/or maintain a desired operational temperature. This is particularly useful in diesel engines which are most commonly used in vehicles having or used in conjunction with power take-off implements. When engagement of the PTO unit is detected, the controller may check (or estimate) the temperature of the after treatment system. In some embodiments, the engine controller may prevent the engine from transitioning out of the skip fire operational mode when the after treatment system is below a designated after treatment (AT) temperature threshold and will continue blocking the transition until the AT temperature reaches the designated AT temperature threshold. This flow is represented by "no" arrow 321 emanating from block 320 in FIG. 3. In other embodiments or instances, the engine controller may set a higher or simply different torque request threshold based on the after treatment system temperature as represented by "no" arrow 322 emanating from block 320. In some implementations, the control logic may be relatively straight forward in that a single higher torque request threshold is used any time the AT temperature is below the AT temperature threshold. In others, a more complex scheme may be used in which the torque request threshold varies as a function of the after treatment system temperature. Factoring the after treatment system temperature into the decision of when to transition out of a skip fire operational mode in an engine driving a PTO device can help improve the emissions characteristics of the engine in a generally fuel efficient manner.

Another check may be based on other emissions related factors. $NO_x$ emission decision block 325 is a good example of such a check. Higher levels of $NO_x$ are generated when combustion temperatures get too high. As previously mentioned, combustion temperatures will generally be higher during skip fire operation of an engine than during all cylinder operation at the same overall engine output since the cylinder load per fired cylinder working cycle will be higher. Some engines have $NO_x$ sensors that have the ability to detect the level of $NO_x$ in the exhaust stream. Alternatively, the engine controller may incorporate algorithms designed to estimate $NO_x$ generation. Regardless, if the $NO_x$ get too high while the engine is in the skip fire operational mode with the PTO device engaged, it may be desirable to immediately transition out the skip fire operational mode. This can be accomplished by comparing the determined $NO_x$ level to a skip fire $NO_x$ threshold as represented by decision block 325. If/when the $NO_x$ emission exceed the $NO_x$ threshold, the engine may immediately transition out of skip fire mode to all cylinder operation as represented by "yes" arrow 326. Transitioning to all cylinder operation is expected to lower the engine's operating temperature, and thus lower the level of $NO_x$ emissions in such circumstances.

In some applications other factors may be used in determining when to transition out of a skip fire operational mode. For example, when the cement mixer of a cement mixer truck is empty, it may be desirable to operate the engine in a skip fire operational mode in more settings than when the mixer is full. In some such embodiments, the torque request threshold may vary based on the fill state status of the mixer. The fill state of the cement mixer can be estimated fairly based on the gross vehicle weight of the truck.

Although only a few specific examples have been provided, it should be appreciated that there are a number of other factors, checks and triggers that may be used in conjunction with or in parallel with the torque request check 308. Some such factors, checks and/or triggers may be emissions related, others may be NVH related and still others may be thermal management related. In some cases, the parallel checks may be arranged to prevent the engine from exiting the skip fire operational mode while the PTO unit is engaged when it may have otherwise exited that mode based on requested torque alone. In other circumstances, the parallel check may cause the requested torque threshold to change. In still others, the parallel check may provide an alternate trigger for exiting the skip fire operational mode. Of course a variety of other factor weighting logic may be employed when desired.

Figure 4:
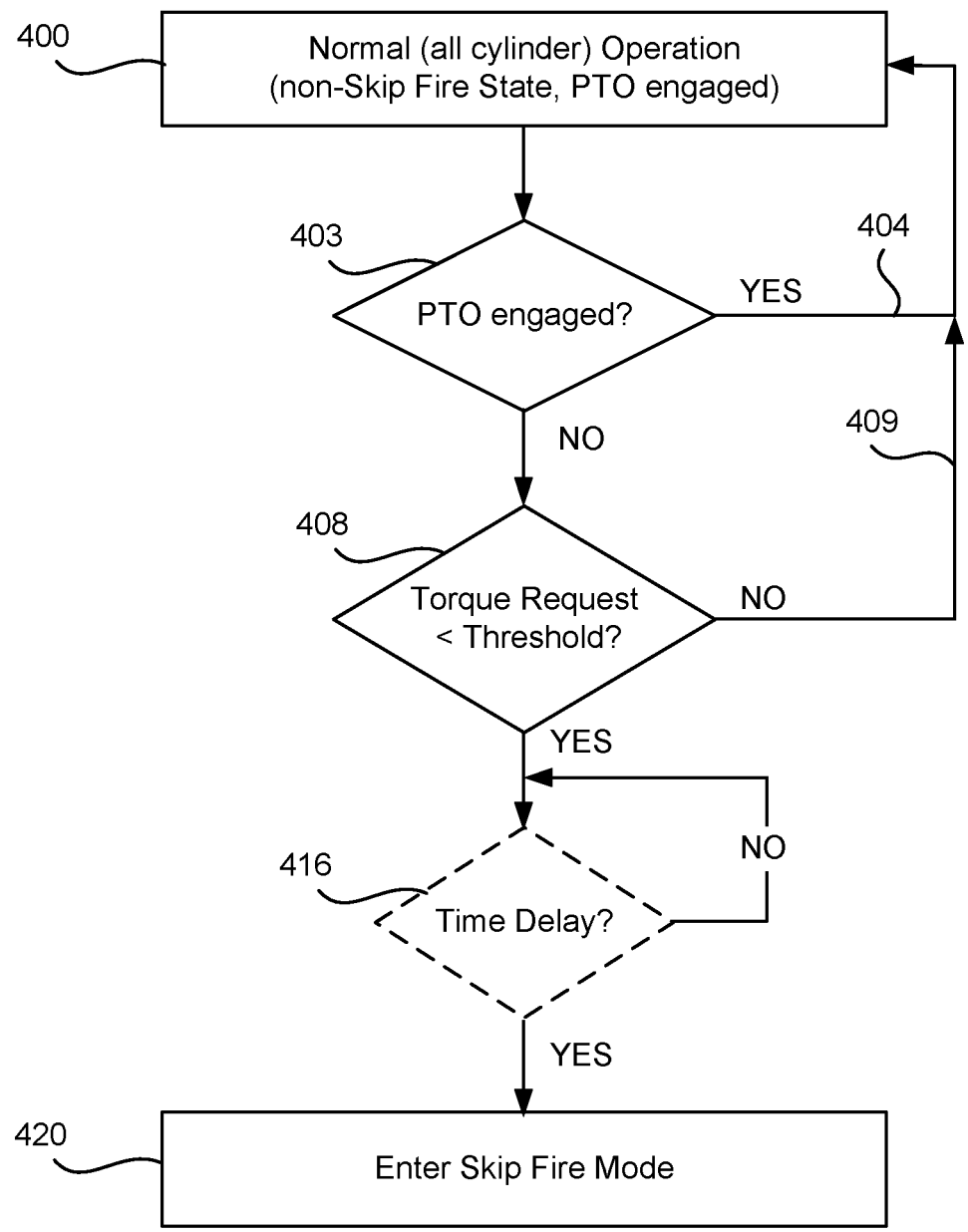
FIG. 4 is a flow chart illustrating a method of transitioning to skip fire engine operation in conjunction with the use of a power take-off implement.

Referring next to FIG. 4, a method for transitioning to skip fire operation in connection with disengagement of a PTO unit will be described. The described flow starts with the engine operating in a full displacement (all cylinders) operating mode with a power take-off unit engaged. Block 400. In step 403, the controller monitors the PTO device/implement for disengagement of the PTO unit. As long as the PTO unit remains engaged, the engine remains in the full displacement operating mode as represented by arrow 404. The disengagement of the PTO unit can be detected in a wide variety of ways generally complementary to the engagement detection schemes discussed above. For example, is some implementations, disengagement of the PTO unit may be detected by detecting when an operator releases a throttle or button associated with operating the PTO implement. In other embodiments, disengagement of the PTO unit disengagement can be detected by determining that the operator is no longer moving the implement (e.g., the operator stops moving the bucket of a utility truck, etc.). Of course, disengagement of the PTO unit can be determined in a wide variety of other manners as well.

When it is determined that the PTO unit has been disengaged, the current engine torque request is compared to a predetermined skip fire operation torque threshold. Step 408. If the requested torque is above the threshold, the engine is kept in the full displacement operating mode as represented by arrow 409. Alternatively, when the PTO unit is disengaged and the requested engine torque is below threshold is below the skip fire operation torque threshold, the engine transitions to a skip fire operation mode as represented by block 420. In some embodiments a time delay is imposed before transitioning to the skip fire operational mode as represented by delay block 416. In some use scenarios, there is a good chance that an operator may reengage the PTO unit shortly after disengagement. An advantage of imposing the time delay before transitioning to the skip fire operational mode is that it reduces the probability that the engine controller will need to revert to full displacement operation shortly after transitioning to the skip fire operational mode due to reengagement of the PTO unit and/or helps avoid frequent transitions back and forth between operating modes. The length of the time delay may vary widely based on the nature of normal use of the PTO implement. For example, in some embodiments, the time delay may be on the order of a few, to many seconds (e.g., 2 to 100 seconds), while in others, the time delay may be on the order of minutes (e.g., 1-5 minutes). Of course longer or shorter delays may be used in particular applications.

It should be appreciated that a number of PTO implements may have fairly wide fluctuations in the torque requests in relatively short periods during normal operation. A example that can readily be envisioned is a stump grinder in which the required torque varies based on how hard the operator presses down on the tool as it works, which for some operators tends to oscillate. Preferably the torque threshold used in check 408 and the latency applied in step 416 are selected to minimize the probability that the PTO unit will cyclically switch back and forth between skip fire and non skip fire operating modes during normal operation of the PTO implement.

In some alternative embodiments, the engine transitions directly to the skip fire operational mode when disengagement of the PTO unit is detected. That is, the torque threshold check 408 is eliminated and the transition is made regardless of the requested engine torque. This is practical in many PTO implementations because it may be impractical for the engine to have a torque request that can't be met by skip fire operation of the engine immediately after disengagement of the PTO unit. In still other embodiments, the transition to skip fire operation may be delayed (step 416) as discussed above when the torque threshold check 408 is eliminated.

In some embodiments, the detection of disengagement of the PTO unit may further require something that suggests that the PTO unit will remain disengaged for a period of time. The time delay before transition of step 416 is one such approach. There are a variety of other checks that can be made to infer whether the PTO unit is likely to be disengaged for a period of time. One such check is seat detection. Many vehicles having PTO implements have a seat that the operator sits in while operating the PTO implement. If the operator has vacated the operating seat, it can be inferred that the PTO unit is unlikely to be used for a period of time and thus the engine may transition to the skip fire operational mode (e.g., directly or in conjunction with torque request check 408). An appropriate detector can be used to determine when the operator has vacated the operating seat.

Other checks can be based on the position, state or movement of the PTO accessory. For example, if a utility truck bucket arm is deployed vertically and/or has been recently moved, it may be inferred that the bucket arm is still in use. In some embodiments, it may be desirable maintain full displacement operation in such circumstances. Such situations can be treated as if the PTO unit remains engaged. In contrast, if the PTO implement is in a home position, it might be inferred that the PTO implement is likely to remain disengaged for a period of time.

In another example, some PTO vehicles have a cab that can rotate relative to a base unit. In such cases, rotational movement of the cab may infer that the operator is likely to continue using the PTO implement. As such, when desired, the controller can be configured to maintain full displacement operation when rotation of the cab is detected. Similarly, some PTO vehicles may be considered likely to use the PTO implement any time the vehicle is in motion. In such vehicles, it may be desirable to maintain full displacement operation when the vehicle is in motion.

Alternatively, some PTO vehicles are unlikely to utilize the PTO implement when moving. For example, some PTO implements are not designed to be utilized while the vehicle (traction wheels) is/are in motion. In such circumstances transition to the skip fire mode may be appropriate at different torque request levels than when the PTO implement is actively being used.

In still other circumstances it may be desirable to trigger entry into the skip fire operational mode even when the skip fire torque request threshold is exceeded. A good example of that type of situation is if/when the temperature of the exhaust gas after treatment system drops below a desired temperature as discussed earlier.

Of course, there are a variety of other circumstances which the developer of the engine control law may deem appropriate to be check to prevent transitions to a skip fire operational mode, or to trigger entry into the skip fire operational mode.

Although only a few embodiments of the invention have been described in detail, it should be appreciated that the invention may be implemented in many other forms without departing from the spirit or scope of the invention. In the various illustrated embodiments, a number of the components are diagrammatically illustrated as independent functional blocks. Although independent components may be used for each functional block in actual implementations, it should be appreciated that the functionality of the various blocks may readily be integrated together in any number of combinations. The functionality of the various functional blocks may be accomplished algorithmically as programmed instructions executing on a processor, in analog or digital logic, using lookup tables or in any other suitable manner.

Although only a few triggers, checks and exit decision factors are described in relation to entering or exiting a skip fire operational mode in conjunction with the use of a PTO implement, it should be appreciated that a variety of other triggers, checks and exit decision factors may be used in addition to and/or in place of some of the described triggers, checks and decision factors in other embodiments. Therefore, the present embodiments should be considered illustrative and not restrictive and the invention is not to be limited to the details given herein, but may be modified within the scope and equivalents of the appended claims.

What is claimed is:

1. A method of operating an engine having a power take-off unit operatively connected thereto, wherein the power take-off unit is configured to selectively engage with the engine and selectively disengage from the engine, the method comprising:
- operating the engine in a skip fire with cylinder deactivation operational mode while the engine is idling with the power take-off unit disengaged from the engine, or the engine is delivering a torque less than a designated threshold torque with the power take-off unit disengaged from the engine;
- detecting a triggering action, wherein the triggering action is indicative of an engagement or an expected engagement of the power take-off unit;
- receiving a current torque request;
- determining whether the current torque request exceeds a power take-off (PTO) skip fire torque threshold; and
- exiting the skip fire with cylinder deactivation operational mode based on detecting the triggering action that indicates the engagement or the expected engagement of the power take-off unit and the current torque request exceeding the PTO skip fire torque threshold.

2. A method as recited in claim 1 further comprising transitioning to an all cylinder operation mode when the engine exits the skip fire with cylinder deactivation operational mode.

3. A method as recited in claim 1 wherein the triggering action is selected from the group consisting of:
- engagement of a clutch associated with the power take-off unit;
- movement of a control stick associated with the power take-off unit; and
- actuation of a throttle or power control actuator associated with the power take-off unit.

4. A method as recited in claim 1 wherein the power take-off unit is arranged to actuate a device selected from the group consisting of:
- a mechanical service arm;
- a lift;
- a mixer;
- a compactor; and
- a grinder.

5. A method of operating an engine having a power take-off unit operatively connected thereto, wherein the power take-off unit is configured to selectively engage with the engine and selectively disengage from the engine, and wherein the engine includes an exhaust gas after treatment system, the method comprising:
- operating the engine in a skip fire with cylinder deactivation operational mode;
- monitoring a temperature of the after treatment system;
- determining whether the temperature of the after treatment system is above a designated temperature threshold; and
- exiting the skip fire with cylinder deactivation operational mode when it is determined that the power take-off unit is engaged and the temperature of the after treatment system is above the designated temperature threshold.

6. A method as recited in claim 5 wherein when it is determined that temperature of the after treatment system is not above the designated temperature threshold, exiting the skip fire with cylinder deactivation operational mode is delayed until the temperature of the after treatment system is above the designated temperature threshold.

7. A method of operating an engine having a power take-off unit operatively connected thereto, wherein the power take-off unit is configured to selectively engage with the engine and selectively disengage from the engine, the method comprising:
- operating the engine in a skip fire with cylinder deactivation operational mode;
- monitoring an exhaust gases pollutant emissions level of the engine;
- determining whether the exhaust gases pollutant emissions level is above a designated emissions level; and
- exiting the skip fire with cylinder deactivation operational mode when it is determined that the exhaust gases pollutant emissions level is above the designated emissions level.

8. A method as recited in claim 7 wherein the monitored exhaust gases pollutant is NOx.

9. A method as recited in claim 7 wherein the exhaust gases pollutant emissions level is a cumulative total for a period of time.

10. A method as recited in claim 7 wherein the exhaust gases pollutant emissions level is a current emissions level.

11. An engine controller configured to direct operation of an engine having a power take-off unit operatively connected thereto, wherein the power take-off unit is configured to selectively engage with the engine and selectively disengage from the engine, the engine controller being configured to:
- direct operation of the engine in a skip fire with cylinder deactivation operational mode with the power take-off unit disengaged from the engine;
- detect a triggering action, wherein the triggering action is indicative of an engagement or an expected engagement of the power take-off unit;
- receive a current torque request; and
- exit the skip fire with cylinder deactivation operational mode based on either (a) detecting the triggering action that indicates the engagement or the expected engagement of the power take-off unit or (b) detecting both (i) the triggering action that indicates the engagement or the expected engagement of the power take-off unit and (ii) the current torque request exceeds a power take-off (PTO) skip fire torque threshold.

12. An engine controller as recited in claim 11 further configured to transition to an all cylinder operation mode when the engine exits the skip fire with cylinder deactivation operational mode.

13. An engine controller as recited in claim 11 wherein the triggering action is selected from the group consisting of:
- detection of an engagement of a clutch associated with the power take-off unit;
- detection of a movement of a control stick associated with the power take-off unit; and
- detection of an actuation of a throttle or power control actuator associated with the power take-off unit.

14. An engine controller as recited in claim 11 further configured to:
- monitor an exhaust gases pollutant emissions level;
- determine whether the exhaust gases pollutant emissions level is above a designated emissions level; and
- cause the engine to exit the skip fire with cylinder deactivation operational mode when it is determined that the exhaust gases pollutant emissions level is above the designated emissions level.

15. An engine controller as recited in claim 14 wherein the monitored exhaust gases pollutant is NOx.

16. An engine controller as recited in claim 14 wherein the exhaust gases pollutant emissions level is a cumulative total for a period of time.

17. An engine controller as recited in claim 14 wherein the exhaust gases pollutant emissions level is a current emissions level.

18. An engine controller as recited in claim 11 wherein the power take-off unit is arranged to actuate a device selected from the group consisting of:
- a mechanical service arm;
- a lift;
- a mixer;
- a compactor; and
- a grinder.

19. An engine controller configured to direct operation of an engine having a power take-off unit operatively connected thereto, wherein the power take-off unit is configured to selectively engage with the engine and selectively disengage from the engine, and wherein the engine includes an exhaust gas after treatment system, the engine controller being configured to:
- direct operation of the engine in a skip fire with cylinder deactivation operational mode with the power take-off unit engaged with the engine;
- monitor a temperature of the after treatment system;
- determine whether the temperature of the after treatment system is above a designated temperature threshold; and
- cause the engine to exit the skip fire with cylinder deactivation operational mode when it is determined that the power take-off unit is engaged with the engine and the temperature of the after treatment system is above the designated temperature threshold.

20. An engine controller as recited in claim 19 further configured such that when it is determined that temperature of the after treatment system is not above the designated temperature threshold, the exit from the skip fire with cylinder deactivation operational mode is delayed until the temperature of the after treatment system is above the designated temperature threshold.

* * * * *